United States Patent
Greif

(10) Patent No.: US 6,676,186 B2
(45) Date of Patent: *Jan. 13, 2004

(54) MOTOR VEHICLE WITH A TAILGATE

(75) Inventor: Thomas Greif, Bonn (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,413

(22) Filed: Jun. 26, 1999

(65) Prior Publication Data

US 2001/0042989 A1 Nov. 22, 2001

(30) Foreign Application Priority Data

Jul. 3, 1998 (DE) .......................... 198 29 731

(51) Int. Cl.$^7$ ............................................ B62D 33/037
(52) U.S. Cl. ................ 296/50; 296/56; 296/146.8; 296/106; 318/445; 318/283; 318/266; 318/466; 318/446; 49/26; 49/27; 49/28
(58) Field of Search .......... 296/50, 56, 146.8, 296/106, 146.4; 49/26, 27, 28; 318/445, 283, 266, 466, 446

(56) References Cited

U.S. PATENT DOCUMENTS

| 3,783,556 A | * | 1/1974 | Cook .............................. 49/27 |
| 4,084,149 A | * | 4/1978 | Driver et al. ................... 340/1 |
| 4,458,446 A | | 7/1984 | Mochida et al. |
| 4,803,488 A | * | 2/1989 | Dombrowski ............... 340/904 |
| 5,028,920 A | * | 7/1991 | Dombrowski ............... 340/904 |
| 5,448,856 A | * | 9/1995 | Moore et al. ................... 49/28 |
| 5,531,498 A | * | 7/1996 | Kowall ..................... 296/146.4 |
| 5,563,483 A | * | 10/1996 | Kowall et al. ............... 318/283 |
| 5,851,050 A | * | 12/1998 | Squire et al. ............. 296/146.4 |
| 5,945,907 A | * | 8/1999 | Yaron et al. ................. 340/436 |
| 5,982,126 A | * | 11/1999 | Hellinga et al. ............ 318/286 |
| 6,068,321 A | * | 5/2000 | Ooms ......................... 296/57.1 |

FOREIGN PATENT DOCUMENTS

| DE | 4004353 | 8/1991 |
| DE | 4119579 | 12/1992 |
| DE | 19533804 | 3/1996 |
| DE | 19607597 | 9/1997 |

OTHER PUBLICATIONS

Patent Abstracts of Japan vol. 1996, No. 02, Feb. 29, 1996, and JP 07 266891 A (Nissan Diesel Motor Co Ltd) Oct. 17, 1995.

* cited by examiner

Primary Examiner—Dennis H. Pedder
Assistant Examiner—Lori L Coletta
(74) Attorney, Agent, or Firm—Martin A. Farber

(57) ABSTRACT

A vehicle with a tailgate (5) or the like, the vehicle being defined in that the tailgate (5) has a sensor for sensing objects at least during the opening operation.

14 Claims, 5 Drawing Sheets

MOTOR VEHICLE WITH A TAILGATE

The invention relates to a motor vehicle with a tailgate or the like.

FIELD AND BACKGROUND OF THE INVENTION

Vehicles, in particular passenger cars, usually have, in the region of the vehicle tail, a tailgate which is closed or can be opened. In order to ensure sufficient accessibility to the compartment covered by the tailgate (in particular the trunk), and in order to avoid the risk of injury to individuals when the tailgate is open, said tailgates are configured such that they project beyond the outer contours of the vehicle, in particular such that they project beyond the top edge of the vehicle or else project laterally on the vehicle in the open state. Furthermore, these tailgates are often provided with pneumatic springs or the like which, once the tailgate has been unlocked, cause the latter to spring automatically into its open position. It may be the case here that, when the tailgate springs into the open position, it comes up against obstacles, for example, in a garage, the ceiling of the latter, with the result that the exterior of the tailgate is damaged. Furthermore, it may be the case that, with tailgates which are provided with an opening aid, the opening aid being actuated by remote control and the tailgate having been unlocked, the tailgate could swing into an individual standing in front of it as it springs open. This is also undesirable since injuries may be caused.

SUMMARY OF THE INVENTION

The object of the invention is thus to provide a motor vehicle with a tailgate or the like in the case of which the situation where the tailgate comes up against an obstacle during the opening operation is actively avoided.

The invention integrates in the tailgate means which are designed for sensing objects at least during the opening operation, these means sensing the region over which the tailgate moves from its closed position into the open position (and, if appropriate, also vice versa). If an obstacle appears during this opening operation (or also during the closing operation), it is possible either for a warning signal to be transmitted (acoustically and/or optically) or else for the rest of the pivoting operation of the tailgate to be interrupted by suitable means. This actively avoids the situation where the tailgate strikes against objects (obstacles) during the opening operation (and likewise during the closing operation, if this is carried out manually or by means of a drive), with the result that it is not possible for anybody to be injured or for the tailgate to be damaged, in particular in the exterior region.

The term "tailgate" has been used up until now, and will continue to be used below, to define the trunk lid of hatchback or fastback sedans and also the tailgate of station wagons or vans as well as the rear loading doors of transporters and trucks.

In a development of the invention, the means for sensing objects are also designed for sensing objects located in the tail region of the motor vehicle, in particular other motor vehicles which are parking. This has the advantage that the means for sensing objects have a double function. On the one hand, they are used as a so-called opening brake, with the result that they sense an obstacle in the pivoting region of the tailgate during the opening operation and transmit the already mentioned warning signal or brake or stop the continuing opening operation. If the tailgate is closed, these means for sensing objects may be used as a so-called parking aid. Using optical and/or acoustic signals, this parking aid signals to the vehicle driver, as he/she is reversing, how much space still remains between his/her own vehicle and the vehicle behind, in order for it to be possible to make optimum use of the available space when parking. Consequently, the means can be used for two different purposes, as a result of which it is advantageously possible to cut back on the number of means required and the assembly outlay is reduced. Since such means for sensing objects, which in one configuration of the invention are designed as radar, infrared and/or ultrasonic sensors, usually project beyond the exterior of the vehicle, the appearance of the vehicle is improved since only one set of the means is provided for two functions.

In a development of the invention, when the vehicle is at a speed above a desired value, in particular equal to or slightly greater than zero, the means for sensing objects act as a parking aid, and below this desired value the means for sensing objects act as an opening brake for the opening operation of the tailgate. Consequently, when the vehicle is stationary, the opening brake can be activated when the tailgate is opened and an obstacle is established, whereas, when the vehicle is parking, the warning signal is transmitted to the driver. This avoids the situation where the opening brake is activated, for example, when the vehicle is parking and an approaching obstacle is established.

In a development of the invention, when an object is sensed during the opening operation, the opening operation is braked or stopped. Provided for this purpose are means which, in dependence on an output signal of the means for sensing objects, brake the continuing opening movement of the tailgate or even stop it briefly. These means for braking or for stopping the opening operation may be integrated, for example, in the gas-pressure shock absorbers, but may also be configured as a separate component and, if appropriate, as a counter-drive. It is also conceivable for these means to be provided in the articulation of the tailgate on the vehicle bodywork (for example in the form of a block brake).

In a development of the invention, a sensor is provided for sensing the opening position of the tailgate, with the result that, when the means function as an opening brake, the sensing of objects is only permitted from a predeterminable opening position of the tailgate. It is assumed here that, once the tailgate has been unlocked, the latter either can travel a certain opening distance automatically or is made to travel this opening distance manually by an individual before the means for sensing objects are activated. This is intended to achieve the situation where the tailgate can be opened to a sufficient extent without braking or stopping, a sufficient opening being one where the tailgate does not yet go beyond the outer contours of the vehicle. It is only when a position which exceeds or is equal to a position corresponding to a position in which the tailgate lies beyond the outer contours of the vehicle has been established that the means for sensing objects are activated or the output signal thereof is released for further processing. If a predeterminable opening position has thus been reached or exceeded, it is possible, when obstacles have been sensed, for braking to be initiated or for the continuing movement of the tailgate to be stopped. It is thus the vehicle user's responsibility to move the tailgate automatically to the predeterminable opening position without the braking operation or stopping being initiated. It is only when the opening operation causes the tailgate to pass into a region which lies beyond the vehicle contours that the automatic mechanism for braking or stopping is activated.

In a development of the invention, in dependence on their respective functions (parking aid/opening brake), the means have different sensing characteristics. It may be provided instead, while maintaining the same sensing characteristics, for the output signal of the means to be evaluated differently. Whereas, for the parking aid, there is a distance of a number of meters before an obstacle appears, and the parking operation takes place relatively slowly, it may be necessary, during the opening operation of the tailgate, for the advancement of the tailgate up to the obstacle to be sensed, and for the continuing movement to be braked or stopped, relatively quickly during this opening operation since, in this case, the distances from obstacles are smaller than when the vehicle is parking. This renders necessary the use of different sensing characteristics or a different evaluation of the output signal of the means for sensing objects.

In a development of the invention, the means are arranged on the bottom border of the tailgate in the closed state of the latter. Consequently, these means are arranged, in the closed state, at a location from which, when the vehicle is parking, other vehicles can be sensed very well. Moreover, during the opening operation, the bottom border of the tailgate covers the greatest possible distance, with the result that very precise sensing of obstacles during the opening operation is possible. The bottom border of the tailgate is usually also that part of the tailgate which, were an obstacle to appear, would be the first region to strike against this obstacle. If, on account of the geometrical configuration of the tailgate, this is not the case, then it should be taken into account correspondingly in the sensing characteristics of the means for sensing objects.

BRIEF DESCRIPTION OF THE DRAWINGS

The present invention is described in more detail hereinbelow with reference to exemplary embodiments and explained with reference to the figures, the invention not being restricted to said exemplary embodiments. In the figures

DETAILED DESCRIPTION OF THE PREFERRED EMBODIMENT

Figure 1:
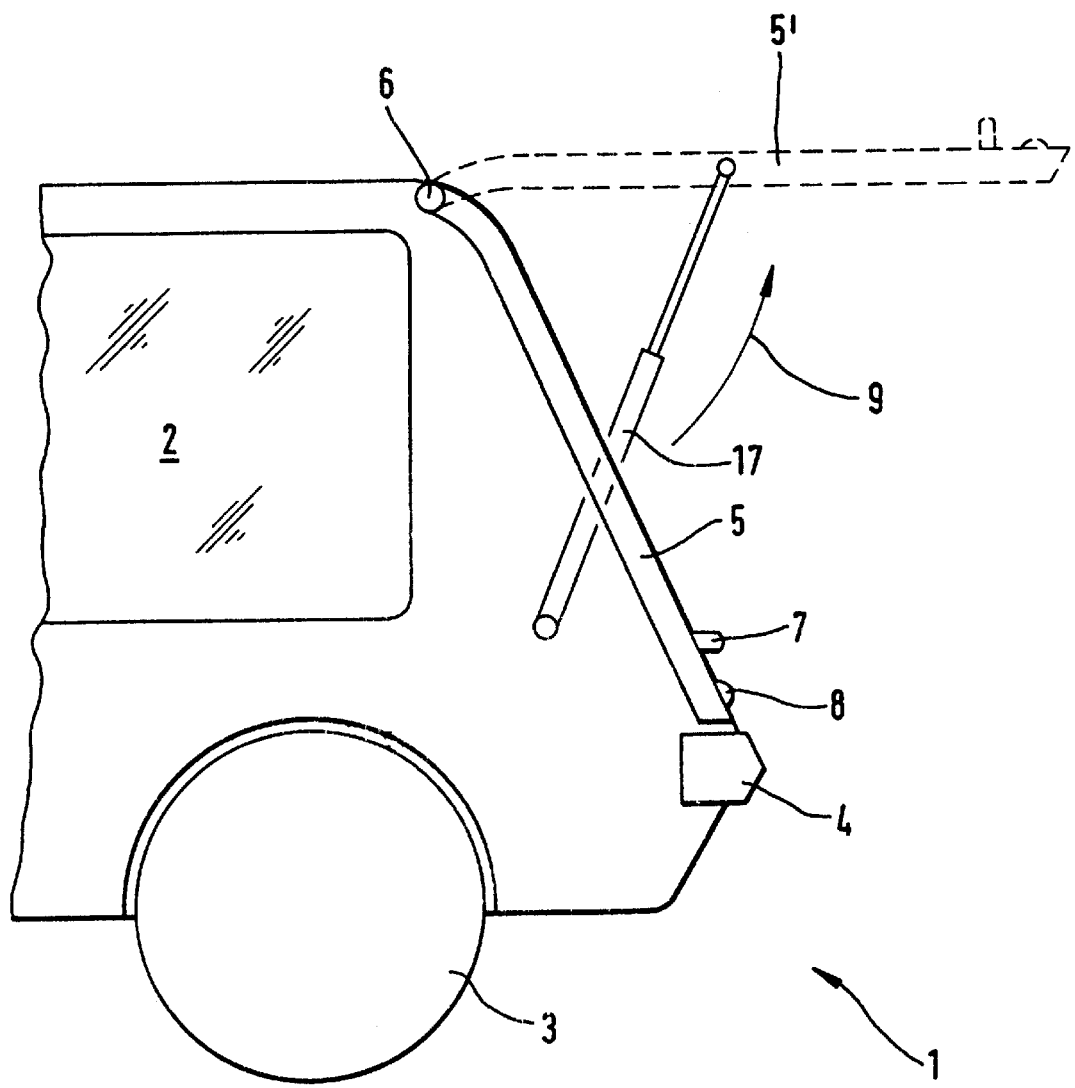
FIG. 1 shows the tail region of a vehicle with schematic representation of a braking actuator using a gas pressure shock absorber.

FIG. 1 illustrates a tail 1 of a vehicle (which is shown in part), a side window 2, a rear wheel 3 and a bumper 4 being indicated in order to aid understanding. A tailgate 5 is articulated on the bodywork of the vehicle such that it can be pivoted about an articulation 6, the design of the articulation 6 not being important here. The open position of the tailgate 5 is illustrated by dashed lines and provided with the designation 5'.

The tailgate 5 also has an operating element 7, which may be, for example, the closing cylinder for the closing device of the tailgates. If the tailgate 5 is provided with a remotely controllable opening aid, said operating element 7 may be dispensed with or, for safety reasons, may be kept for redundancy.

As can be seen in FIG. 1, a sensor 8 is provided, as the means for sensing objects, on the bottom border of the tailgate 5, it also being possible for a number of these sensors 8 to be provided along the bottom border of the tailgate 5. This is the case, in particular, when the sensor 8 is not just intended for sensing objects during the opening operation of the tailgate 5 in a pivoting direction 9, but is also used as a parking aid. Moreover, a further advantage to be mentioned here is that the sensor 8 (or a plurality of sensors 8) is/are arranged in a region which is very close to the bumper 4, whereas the sensors of already known parking aids are arranged in the bumper. Thus, the present configuration allows the bumper 4 to be of a more simple design, and it is also the case that the situation where, despite the parking aid, the bumper 4 is damaged, and costly repair is required for the parking aid or its sensors, is actively avoided.

Figure 2:
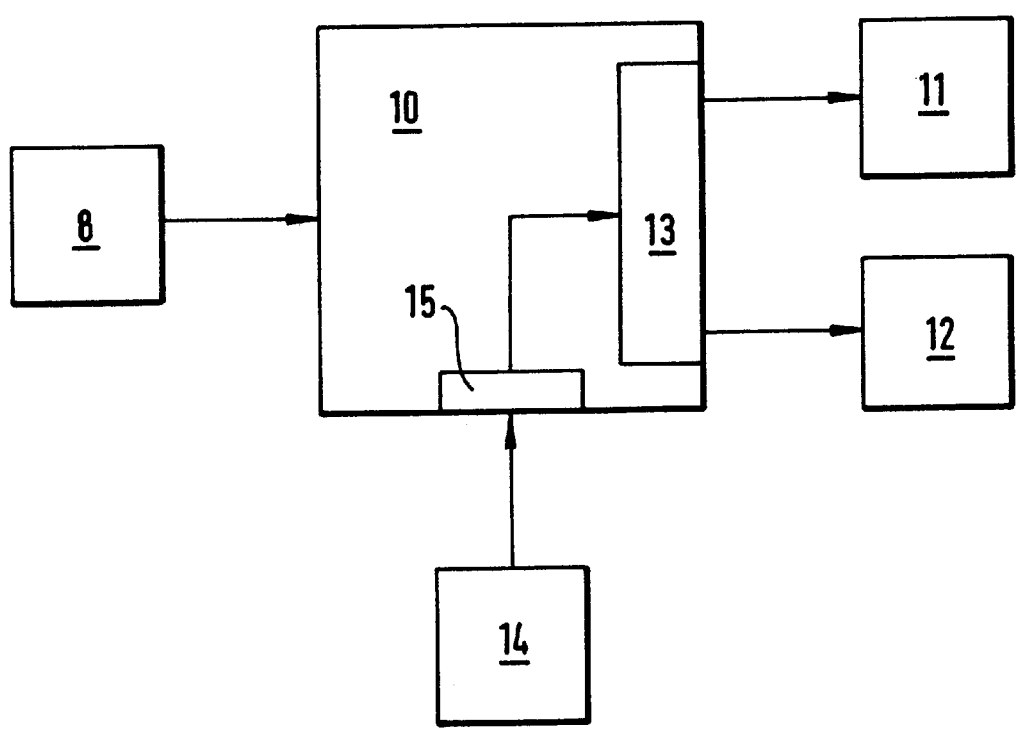
FIG. 2 shows a control device and its electrical connections.
Figure 3:
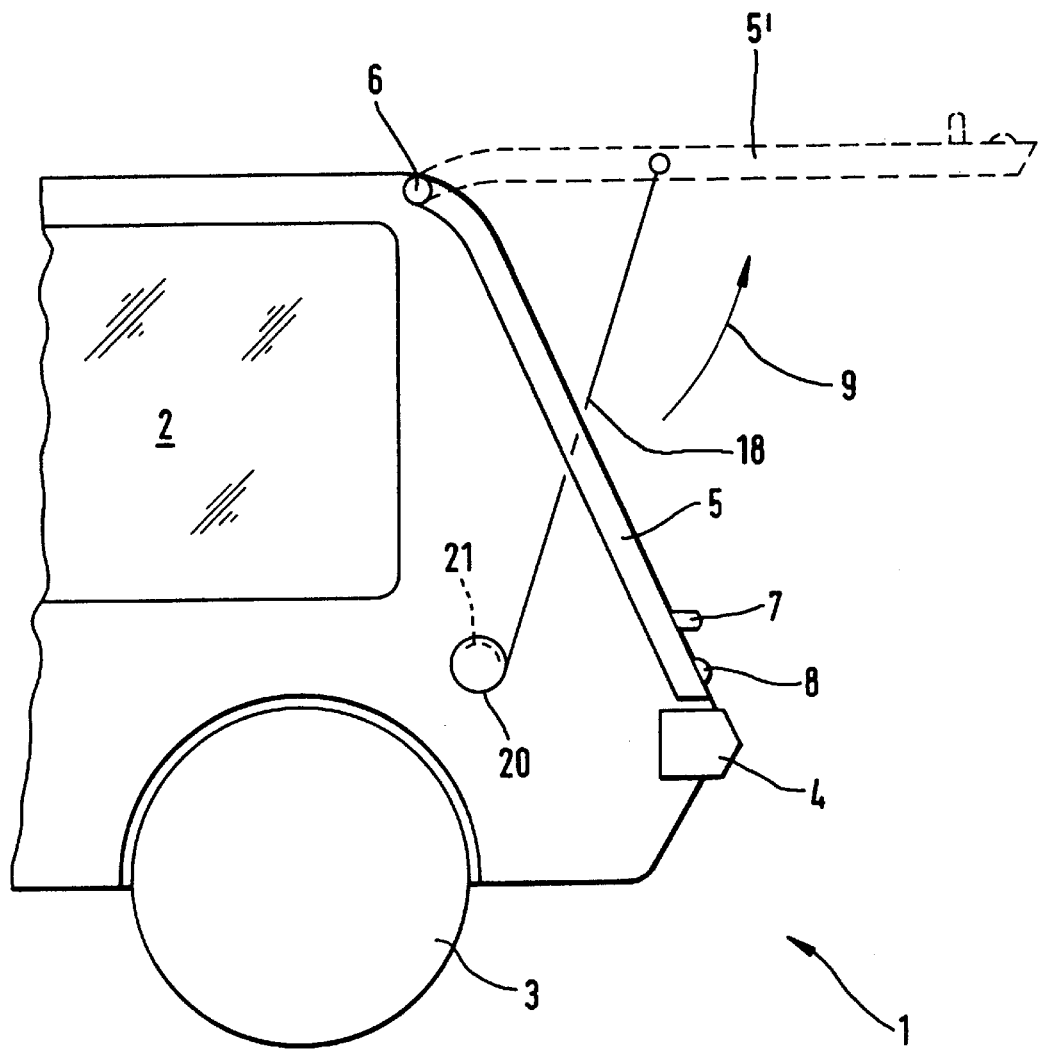
FIG. 3 shows a second embodiment of the tail region of a vehicle with a schematic representation of the braking actuator using a cable, cable drum and brake shoes.
Figure 4:
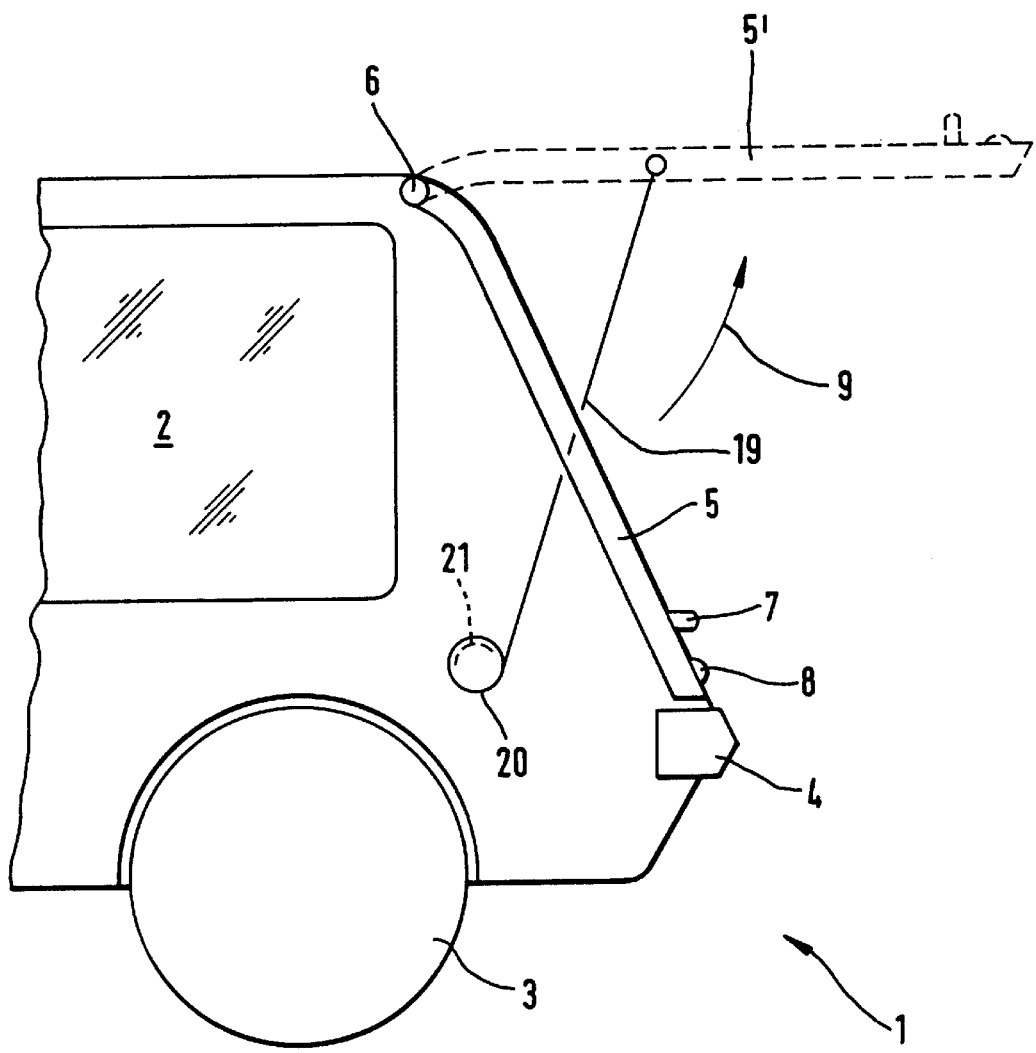
FIG. 4 shows a third embodiment of the tail region of a vehicle with a schematic representation of the braking actuator using a Bowden wire.
Figure 5:
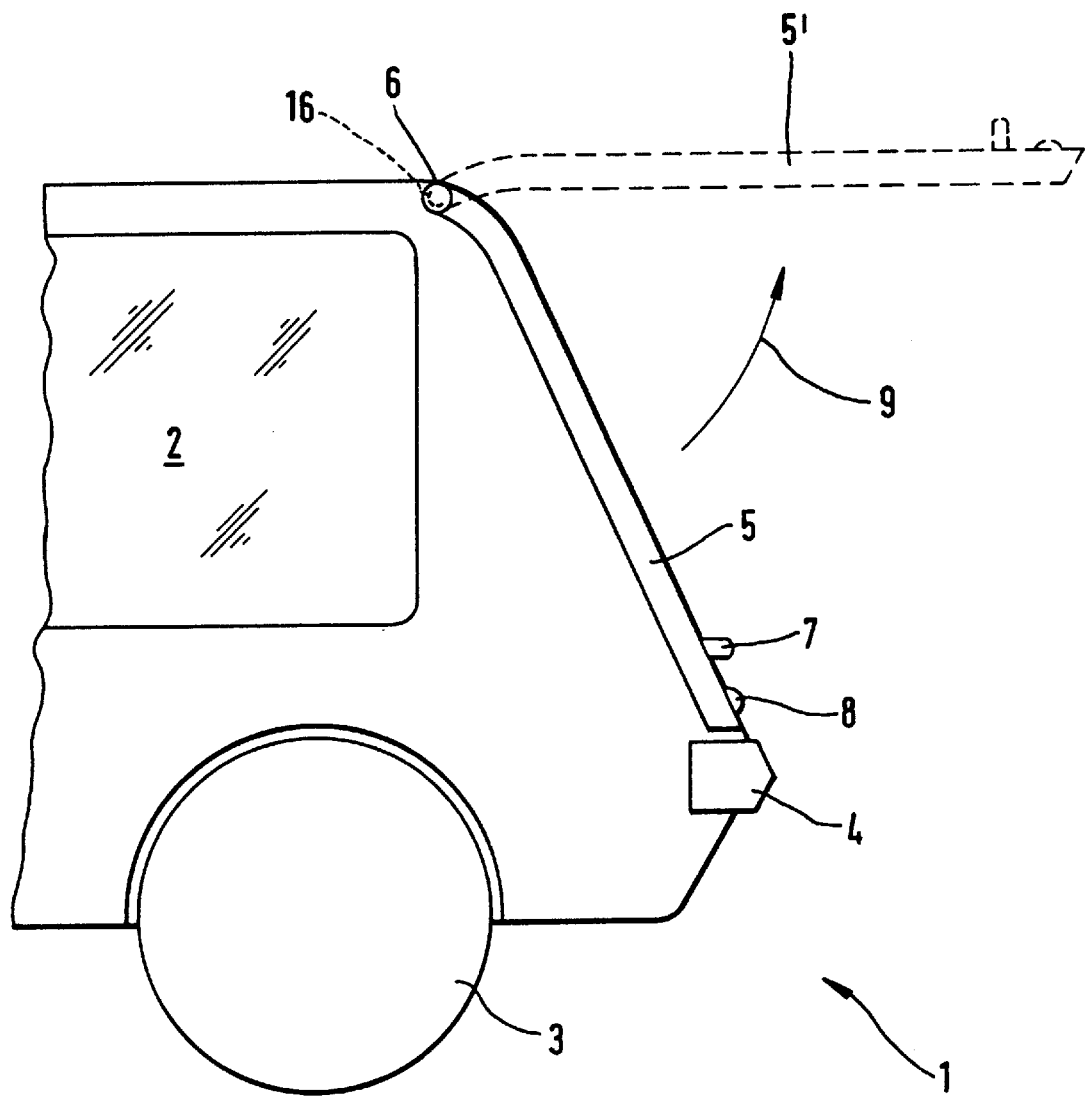
FIG. 5 shows a fourth embodiment of the tail region of a vehicle with a schematic representation of the braking actuator using a friction brake.

FIG. 2 shows a control device 10 and its electrical connections, said device being connected up to the sensor 8 (or to a plurality of sensors). On the one hand, said control device 10 is designed such that depending on the output signal of the sensor 8, when an obstacle is sensed, one or more braking actuators 11 is or are activated. This braking actuator 11 is configured such that it brakes or stops the continuing opening operation of the tailgate 5. A possible configuration of a braking actuator which is a type of friction brake 16, which is schematically shown in FIG. 5, and which acts on a spindle of the tailgate 5 in the articulation 6. Instead of this, in the case of tailgates 5 which are provided with gas-pressure shock absorbers 17, shown schematically in FIG. 1, said gas-pressure shock absorber 17 may be modified such that the rest of the opening operation is interrupted by a change in the gas volume. Also conceivable is a cable 18 (schematically shown in FIG. 3), a Bowden wire 19 (schematically shown in FIG. 4) or the like, which is arranged on the tailgate 5 and, during the opening operation, unrolls from a cable drum 20 arranged laterally on the bodywork. If the sensor 8 senses an obstacle, the unrolling operation of the cable brakes or stops, thus interrupting the rest of the opening operation of the tailgate 5. It would likewise be possible for brake shoes 21 to act on the cable 18, a rod or the like.

The control unit 10 also has an output device 12, which may be used, on the one hand, for transmitting an optical and/or an acoustic signal when an obstacle appears during the opening operation of the tailgate 5. Furthermore, while maintaining the same design, this output device 12 may also be used for another function, as is outlined hereinbelow. A changeover device 13 is integrated in the control device 10, said changeover device 13 being activated at least by a speed sensor 14, which senses the speed of the vehicle. The output signal of the speed sensor 14, that is to say the determined speed of the vehicle, is supplied to a differentiating device 15 integrated in the control device 10. If the differentiating device 15 establishes that the speed is above a desired value, in particular equal to or slightly greater than zero, it can be assumed, when the vehicle is reversing, that the control device 10 is to be operated as a so-called parking aid. In this case, the output signal of the sensor 8, said signal constituting the distance between this vehicle and a vehicle located behind, is evaluated by the control device 10 and, in dependence on the distance between the two vehicles, the output device 12 is activated by the changeover device 13, with the result that said output device 12 informs the driver as to how much space is still available for parking.

If the speed sensor 14 transmits a signal which constitutes a stationary vehicle, this is sensed by the differentiating device 15 and the output signal of the sensor 8 is transmitted to the braking actuator 11 by the changeover device 13, with the result that, when the tailgate 5 is opened, the sensor 8 then senses objects and the braking actuator 11 can be activated in the abovedescribed manner before the tailgate 5 strikes against such an object.

Also conceivable, but not illustrated in FIG. 2, is a further sensor which is connected up to the control device 10 and senses the opening position of the tailgate 5. This sensor interrupts the transmission of the output signal of the sensor 8 to the braking actuator 11 or deactivates the braking actuator 11 until the tailgate 5 has reached, or exceeded, a position in which it goes beyond the outer contours of the vehicle. This means that the control device 10, and thus the braking actuator 11, is not activated as long as there is no damage to the tailgate 5. It is only when the tailgate 5 is located in a region in which damage would be possible that activation of the braking actuator 11 is permitted.

List of Designations

1. Vehicle tail
2. Side window
3. Rear wheel
4. Bumper
5. Tailgate
6. Articulation
7. Operating element
8. Sensor
9. Pivoting direction
10. Control device
11. Braking actuator
12. Output device
13. Changeover device
14. Speed sensor
15. Differentiating device

I claim:

1. A vehicle with a tailgate, wherein the tailgate has means for sensing objects located in a tail region of the vehicle during an opening or closing operation of the tailgate, wherein when the vehicle is at a speed above a predetermined value, in particular slightly greater than zero, the means act as a parking aid, and when the vehicle speed is equal to zero, the means act as an opening brake for the opening of the tailgate.

2. The vehicle as claimed in claim 1, wherein the sensing means have a plurality of sensing characteristics, a first of said sensing characteristics being employed for the parking aid, and a second of said sensing characteristics being employed for the opening brake.

3. A vehicle with a tailgate, wherein the tailgate has means for sensing objects at least during an opening operation of the tailgate, wherein the sensing means comprises radar, infrared or ultrasonic sensors, the tailgate further comprising a braking actuator for braking the tailgate, and a control device operatively connected to said sensing means and said braking actuator for braking an opening movement of the tailgate.

4. The vehicle as claimed in claim 3, wherein said braking actuator is a friction brake.

5. The vehicle as claimed in claim 3, wherein said braking actuator is a gas-pressure means.

6. The vehicle as claimed in claim 3, wherein said braking actuator is a cable.

7. The vehicle according to claim 3, wherein said braking actuator is a Bowden wire.

8. The vehicle as claimed in claim 3, wherein said braking actuator is brake shoes.

9. A vehicle with a tailgate, wherein the tailgate has operating means for sensing objects located in a tail region of the vehicle during an opening operation or a closing operation of the tailgate; and when one of said objects is sensed during the opening operation or the closing operation, the opening operation or the closing operation is braked or stopped, or a warning signal is transmitted, and wherein the operating means are provided as radar, infrared or ultrasonic sensors, wherein said operating means has a first sensor for the sensing of said objects and a second sensor for sensing the opening position of the tailgate, wherein, when the operating means function as an opening brake, the sensing of the objects by the first sensor is only permitted from an initial value of opening position of the tailgate.

10. The vehicle as claimed in claim 9, wherein the operating means are arranged on the bottom border of the tailgate.

11. The vehicle as claimed in claim 9, further comprising braking means which brake or interrupt the opening operation or the closing operation of the tailgate when one of said objects is sensed.

12. The vehicle as claimed in claim 9, wherein the operating means for sensing one of said objects are also adapted for sensing other vehicles which are parking.

13. A vehicle with a tailgate, wherein the tailgate has operating means for sensing objects located in a tail region of the vehicle during an opening operation or a closing operation of the tailgate; and when one of said objects is sensed during the opening operation or the closing operation during a stationary condition of the vehicle, the opening operation or the closing operation is braked or stopped, or a warning signal is transmitted; and wherein during movement of the vehicle, the operating means serves as a parking aid for transmitting a warning signal upon a sensing of one of said objects.

14. A vehicle with a tailgate, wherein the tailgate has operating means for sensing objects located in a tail region of the vehicle during a closing operation of the tailgate; and when one of said objects is sensed during the closing operation in a stationary condition of the vehicle, the closing operation is braked, the closing operation is stopped, or a warning signal is transmitted; and when one of said objects is sensed during a condition of movement of the vehicle, the operating means serves as a parking aid by transmitting a warning signal upon a sensing of one of said objects.

* * * * *